United States Patent Office 3,636,053
Patented Jan. 18, 1972

3,636,053
PREPARATION OF 2,3,4,5-TETRAHYDROOXEPIN
Donald A. Tyssee, St. Louis, Mo., assignor to
Monsanto Company, St. Louis, Mo.
No Drawing. Filed Apr. 1, 1969, Ser. No. 812,317
Int. Cl. C07d 9/00
U.S. Cl. 260—333       6 Claims

ABSTRACT OF THE DISCLOSURE 2,3,4,5-tetrahydrooxepin is prepared in high yields of contacting tetrahydropyran-2-methanol in the gaseous state with at least one of a certain group of catalysts, e.g. silica-alumina catalyst, at a temperature above about 150° C. 2,3,4,5-tetrahydrooxepin is a useful reactant for the preparation of vinyl ether polymers or copolymers. Also, 2,3,4,5-tetrahydrooxepin may be reduced to oxepane, the corresponding saturated cyclic ether, which possesses good solvent properties.

BACKGROUND OF THE INVENTION

Very little has been reported in the literature relating to 2,3,4,5-tetrahydrooxepin and its preparation. That which has been reported has been limited solely to laboratory experiments or curiosities. D. R. Larkin, J. Org. Chem. 30, 335 (19665), describes the dehydration of 1,6-hexanediol over a 15% copper-0.85% chromium on kieselguhr catalyst to give 2,3,4,5-tetrahydrooxepin and F. Nerdel, et al., Tetrahedron Letters 44, 5385 (1966), describes the following liquid phase reaction:

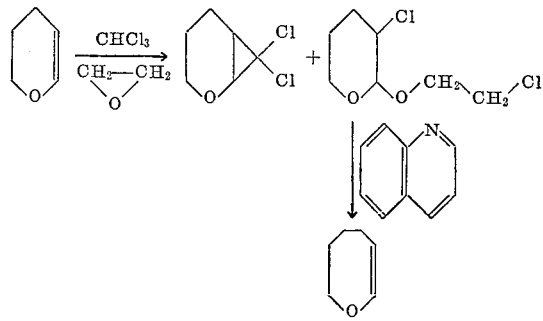

The methods described in the literature for preparing 2,3,4,5-tetrahydrooxepin however are not practical for commercial applications in that the starting material (1,6-hexanediol) or the reagents employed are too costly, or that undesirable by-products are formed.

An object of the present invention, therefore, is to provide a commercially attractive process for preparing 2,3,4,5-tetrahydrooxepin.

Another object of the invention is to provide a process for preparing 2,3,4,5-tetrahydrooxepin wherein the starting materials employed are readily available and relatively inexpensive.

Still a further object of the invention is to provide a one-step, straightforward process for preparing 2,3,4,5-tetrahydrooxepin in good yields.

SUMMARY OF THE INVENTION

The above-stated and other objects of the invention are accomplished by a process which comprises contacting tetrahydropyran-2-methanol in the gaseous state with at least one catalyst selected from a particular group of catalysts, hereinafter described, at temperatures ranging from about 150° C. to temperatures below which excessive decomposition of the organic compounds present occurs. The reaction product contains from about 60 to 90% 2,3,4,5-tetrahydrooxepin. The reaction presumably involves dehydration of tetrahydropyran-2-methanol followed by molecular rearrangement and may be represented by the following formula:

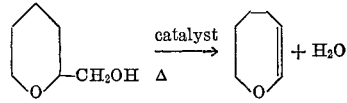

DESCRIPTION OF THE PREFERRED EMBODIMENTS (A) Reactant

Tetrahydropyran-2-methanol is readily available commercially or, if desired it can be conveniently prepared by known steps; for example, by oxidizing propylene to acrolein; heating a solution of the acrolein in an equal weight of benzene containing about 1% hydroquinone to about 170° C. under pressure sufficient to maintain the mixture liquid to form the acrolein dimer (2-formyl-3,4-dihydropyran) and then hydrogenating the 2-formyl-3,4-dihydropyran to tetrahydropyran-2-methanol employing a suitable hydrogenation catalyst, such as Raney nickel.

(B) The catalyst

The key to the successful operation of the process described herein resides in selection of the catalyst. The preferred catalysts for use in the process are the silica-alumina catalysts. Suitable silica-alumina catalysts include the commercially available silica-alumina catalysts which contain varying amounts of silica and alumina. Generally, the commercially available catalysts contain from about 10–30% alumina and 90–70% silica, respectively.

Other catalysts which may be used in the process are: silica-alumina-containing materials, such as zeolites; copper chromite catalysts ,CuO/Cr$_2$O$_3$); silica-containing materials, such as kieselguhr; silica catalysts; and modifications of these and the silica-alumina catalysts wherein the catalysts are pretreated with basic materials, such as ammonium or metal hydroxides, e.g., sodium hydroxide.

Only the above-specified catalysts have been found suitable for use in converting tetrahydropyran-2-methanol to 2,3,4,5-tetrahydrooxepin in practical yields. Surprisingly, when conventional activated alumina catalysts are employed in the process, tetrahydropyran-2-methanol is converted to cyclopentanecarboxyaldehyde.

(C) Reaction conditions

The dehydration and rearrangement of tetrahydropyran-2-methanol to 2,3,4,5-tetrahydrooxepin may be effected by contacting it in the gaseous state with the catalyst at a temperature ranging from above about 150° C. up to temperatures causing excessive thermal decomposition of the organic material present. Generally, temperatures from 150° to 550° C. are suitable with temperatures from 300° C. to 450° C. being preferred. Any appropriate apparatus may be employed, although the process most conveniently is carried out in an apparatus adapted to continuous operations. Thus, a stream of tetrahydropyran-2-methanol is passed through a suitably heated reaction tube packed with catalyst. Conveniently, the tetrahydropyran-2-methanol is volatilized in a preheater and a stream of vapors passed into the reactor and into contact with the catalyst. The process may be carried out at atmospheric pressures or at pressures below or above atmospheric pressures so long as the pressures are sufficient to keep the reactants in the vapor phase. If desired, a carrier gas inert under the reaction conditions, such as nitrogen, hydrogen, methane, and the like, may be mixed with the tetrahydropyran-2-methanol vapors and the vaporous mixture introduced into the reactor.

The flow rate of tetrahydropyran-2-methanol through the tubular reactor may vary considerably depending upon the particular catalyst, the reaction temperature, size of the reactor, and the conversion per pass desired. Generally, as an average, one pound of catalyst will yield from 20 to 25 pounds of 2,3,4,5-tetrahydrooxepin before the useful life of the catalyst elapses.

The 2,3,4,5-tetrahydrooxepin may conveniently be separated from the reaction mixture by collecting the reaction product in a flask cooled with a Dry Ice-acetone mixture (−78° C.) and subsequently isolating 2,3,4,5-tetrahydrooxepin (boiling point 114° C.) by fractional distillation.

According to one aspect of the invention, the 2,3,4,5-tetrahydrooxepin is converted to oxepane. This may be accomplished by either passing 2,3,4,5-tetrahydrooxepin in the vapor phase into contact with a conventional hydrogenation catalyst such as Raney nickel at suitable temperatures using hydrogen as a carrier gas or by subjecting it to liquid phase hydrogenation also employing a conventional hydrogenation catalyst and hydrogen.

The following examples are given to more fully illustrate the manner in which the invention may be practiced.

EXAMPLE 1

Twenty-four cubic centimeters 13% alumina-87% silica, ground and sieved to a 10/20 mesh, was placed in a stainless steel reactor tube having a length of 60.96 centimeters and a diameter of 1.27 centimeters. Tetrahydropyran-2-methanol in the vapor phase was passed into the tube at the rate of twelve milliliters per hour using hydrogen as a carrier gas. The pressure was maintained at one atmosphere by controlling the flow of hydrogen. The catalyst was maintained at a temperature of 350° C. The vapors were in contact with the catalyst for about 5 seconds. The mixture leaving the tube was collected in a flask cooled to −78° C. by means of a Dry Ice-acetone bath. 2,3,4,5-tetrahydrooxepin having a boiling point of 114° C. was then separated from the resulting liquid by fractional distillation. Based on the moles of tetrahydropyran-2-methanol feed introduced into the reaction, 85% thereof reacted to form products; 86% of the reacted tetrahydropyran-2-methanol was converted to 2,3,4,5-tetrahydrooxepin. This may conveniently be expressed as an 86% yield of the oxepin at an 85% conversion.

EXAMPLES 2–8

The procedure of Example 1 was repeated in Examples 2–8 with the exception that the reactor temperature, catalyst and flow rate of tetrahydropyran-2-methanol were varied as indicated in the table below. The yield of 2,3,4,5-tetrahydrooxepin in each example was determined as a percentage of the reacted feed which was converted to the oxepin and is expressed as percent oxepin at percent conversion of tetrahydropyran-2-methanol.

| Example | Temp., °C. | Catalyst | Flow rate, ml./hr. | Yield |
|---|---|---|---|---|
| 2 | 350 | 13% Al$_2$O$_3$–87% SiO$_2$ | 12.5 | 62.2% at 96.3%. |
| 3 | 370 | repeat | 13.5 | 67.2% at 81.0%. |
| 4 | 370 | repeat | repeat | 63.8% at 87.8%. |
| 5 | 370 | repeat | 7 | 72.0% at 79.6%. |
| 6 | 370 | repeat | 7 | 69.4% at 83.1%. |
| 7 | 380 | SiO$_2$ | 12.5 | 60.0% at 50.0%. |
| 8 | 350 | Copper chromite on kieselguhr. | 12.5 | 72.8% at 40.0%. |

Similar results are also obtained when the procedures of Examples 1–8 are carried out using a modified form of the catalyst wherein the catalyst is pretreated with a basic material such as sodium hydroxide.

EXAMPLE 9

A tubular reactor, identical to the reactor employed in Example 1, was packed with a commercially available nickel catalyst. 2,3,4,5-tetrahydrooxepin obtained from Example 1 was vaporized and passed into the reactor at the rate of 12 ml./hr. using hydrogen as a carrier gas. The pressure was one atmosphere and the reactor temperature was about 110° C. The product was collected as in Example 1 and oxepane (boiling point 125° C.) was separated from the product by distillation. The yield of oxepane was 98% at an 80% conversion.

A second run was made using the same procedure with the exception that the 2,3,4,5-tetrahydrooxepin was not separated from the gaseous product; that is, the gaseous product resulting from passing tetrahydropyran-2-methanol in the gaseous state over the silica-alumina catalyst, was passed into the reactor and into contact with the nickel catalyst under the conditions specified. The yield of oxepane obtained was substantially the same as in the above run.

EXAMPLE 10

The procedure of Example 1 was repeated with the exception that instead of employing the alumina-silica catalyst of Example 1 a Grade A activated alumina catalyst was employed. The product in this instance was cyclopentanecarboxaldehyde.

It will be understood from the foregoing description of the invention that many variations in the reaction conditions may be made without departing from the spirit of the invention.

What is claimed is:

1. A process for the preparation of 2,3,4,5-tetrahydrooxepin which comprises:
   (A) contacting tetrahydropyran - 2 - methanol in the gaseous state at temperatures ranging from about 150° C. to below temperatures at which excessive thermal decomposition of the organic compounds present occurs with a material selected from the group consisting of silica-alumina having a silica content of at least 70% silica, copper chromite and mixtures thereof and modifications thereof wherein said material is pretreated with a basic material and
   (B) recovering from the reaction mixture 2,3,4,5-tetrahydrooxepin.

2. The process of claim 1 wherein said tetrahydropyran-2-methanol contacts said material at temperatures between about 300° and 450° C.

3. The process of claim 1 wherein the catalyst contains 87% silica and 13% alumina.

4. The process of claim 1 wherein the material is copper chromite on kieselguhr.

5. The process of claim 1 wherein the material is silica.

6. The process as defined in claim 1 wherein hydrogen is employed as a carrier gas.

References Cited

UNITED STATES PATENTS 2,480,990   9/1949   Whetstone _____ 260—598

OTHER REFERENCES

Larkin, D. R., Jour. Org. Chem., 30, February 1965, pp. 335–9.

Misono, A., et al., Bull. Chem. Soc. Japan, 41, October 1968, pp. 2447–53.

NORMA S. MILESTONE, Primary Examiner

U.S. Cl. X.R.

260—345.9